United States Patent [19]

Lin

[11] Patent Number: 4,634,523

[45] Date of Patent: Jan. 6, 1987

[54] FLUID SUPPLY DEVICE WITH PERIODICALLY POSITIVE AND REVERSE FLOW CLEANING CYCLE

[76] Inventor: Po-Chi Lin, No. 21, Lane 57, Fu-Der Road, Shyh-Lin, Taipei, Taiwan

[21] Appl. No.: 713,758

[22] Filed: Mar. 19, 1985

[51] Int. Cl.⁴ .................... B01D 23/24; B01D 29/38
[52] U.S. Cl. .................................. 210/140; 210/142; 210/143
[58] Field of Search ............... 210/138, 139, 140, 141, 210/142, 143

[56] References Cited

U.S. PATENT DOCUMENTS 4,005,013  1/1977  Hinton ............................. 210/138

Primary Examiner—Frank Sever
Attorney, Agent, or Firm—Leonard Bloom

[57] ABSTRACT

The instant invention provides a fluid supply system, wherein in its working mode a pump delivers fluid through a filter in one direction to a discharge outlet, an improvement comprising a relief outlet and controlled valve means interposed between said pump and said discharge outlet and between the pump and the relief outlet, means for selectively controlling said controlled valve means (1) to effect delivery of fluid from said pump through said filter, in the one direction, and through said valve means to said discharge outlet in the working mode, (2) to effect passage of fluid from said pump through said filter, in a direction opposite to the one direction, and through the valve means to said relief outlet in reverse cleaning mode and (3) to effect passage of fluid from said pump through said filter, in the one direction, and through the valve means to said relief outlet in forward cleaning mode.

11 Claims, 18 Drawing Figures

TABLE 1

| CONTROLLED VALVE / FUNTION | V21 | V22 |
|---|---|---|
| STAND BY | T ← B<br>P → A | P → A |
| REVERSING CLEAN | T↘↗B<br>P↗↘A | ↗B<br>P↗ |
| FORWEAD CLEAN | T ← B<br>P → A | T↘↗B<br>P↗↘A |

TABLE 2

| CONTROLLED VALVE / FUNTION | V31 | V32 | V33 |
|---|---|---|---|
| STAND BY | P↘B | B↙P | P↘B |
| REVERSING CLEAN | P → A | A ← P | P → A |
| FORWEAD CLEAN | P↘B | B↙P | P → A |

TABLE 3

| CONTROLLED VALVE / FUNTION | V61 | V62 | V63 | V64 | V65 | V66 |
|---|---|---|---|---|---|---|
| STAND BY | →⊖→ | ⊣⊢ | ⊣⊢ | ⊣⊢ | →⊖→ | ⊣⊢ |
| FORWEAD CLEAN | →⊖→ | ⊣⊢ | ⊣⊢ | →⊖→ | ⊣⊢ | →⊖→ |
| REVERSING CLEAN | ⊣⊢ | →⊖→ | →⊖→ | ⊣⊢ | ⊣⊢ | →⊖→ |

4,634,523

FLUID SUPPLY DEVICE WITH PERIODICALLY POSITIVE AND REVERSE FLOW CLEANING CYCLE

BACKGROUND OF THE INVENTION

Traditional fluid supply device usually assembles filter for promoting the cleanness of the output fluid, i.e. filter of the drinking water supply machine, automatic drinking fluid supply machine, industrial air compressor or hydraulics system also assembles filter, but, by slow accumulation, and for a long time, the dirts on filter must be cleaned, if user neglects it to cause blockade or pollute the fluid, the present invention can provide structure of automatic periodically positive and reverse flow cleaning cycle to improve the above defect.

SUMMARY OF THE INVENTION

The present invention relates to a fluid supply device with filter automatic cleaning structure in the return, mainly according to the timing periodical instruction of cycling timer, or the accumulative type of control instruction of output flow or pump times of pump, the control value group can cause the return to make cyclic cleaning action of positive and reverse flow in order to clean fliter and return automatically as its purpose.

BRIEF DESCRIPTION OF THE DRAWINGS

FIG. 1-1 is a graphic view of FIG. 1 under normal status.

FIG. 1-2 is a graphic view of FIG. 1 under reverse flow cleaning status.

FIG. 1-3 is a graphic view of FIG. 1 under positive flow cleaning status.

FIG. 2 is an embodiment of the return of three piece value group.

FIG. 2-1 is a graphic view of FIG. 2 under normal status.

FIG. 2-2 is a graphic view of FIG. 2 under reverse flow cleaning status.

FIG. 2-3 is a graphic view of FIG. 2 under positive flow cleaning status.

FIG. 3 is an embodiment of the return of six-piece value group.

FIG. 3-1 is a graphic view of FIG. 3 under normal status.

FIG. 3-2 is a graphic view of FIG. 3 under positive flow cleaning status.

FIG. 3-3 is a graphic view of FIG. 3 under reverse flow cleaning status.

Chart 1 is a diagram of action of two -piece valve group.

Chart 2 is a diagram of action of three-piece valve group

Chart 3 is a diagram of action of six-piece valve group.

DETAILED DESCRIPTION OF THE INVENTION

Fluid supply device with periodically positive and reverse flow cleaning cycle of the present invention, it is mainly constituted by a fluid pump, a set of cyclic control switch, several electro-magnetic control valve groups and filter, wherein, fluid pump, electro-magnetic valve and filter are connected by some distributed conduits, electro-magnetic valve and fluid pump are controlled by periodical switch, its main character is that its constitutive type is that:

Preparative status is that electro-magnetic pump group is under ready situation, when pump is pumped, fluid flows through electro-magnetic pump into filter, and then it is transmitted to outlet by an electro-magnetic pump;

The first working status formed by electro-magnetic valve group is that fluid pumped by fluid pump flows through electromagnetic valve in positive direction into filter, and then flows out through an electro-magnetic valve;

When cyclic control switch sends out cleaning cyclic instruction, its main action of cleaning cycle includes that cyclic control switch set instructs several electro-magnetic valve to be electrified and controlled, fluid pump is driven, fluid flows into filter in reverse direction, and then flows through an electromagnetic valve and out from outlet;

Next instruction status is that fluid pumped by fluid pump flows into filter in positive direction, and then flows through an electro-magnetic valve and out from outlet;

During the period of instruction of cyclic control switch set, above automatically cyclic period is one time or more, and then return to the preparative status.

Figure 1:
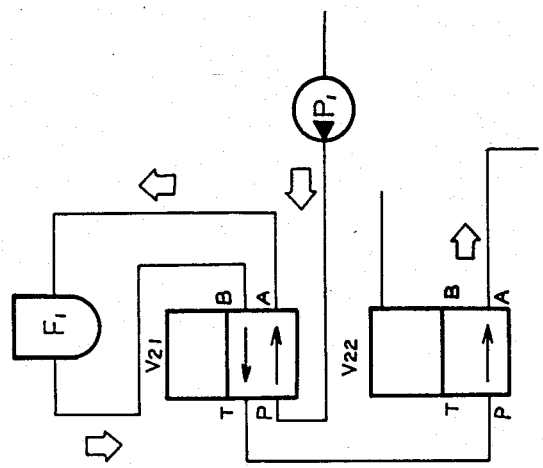
FIG. 1 is an embodiment of the return of two-piece value group.
Figure 1:
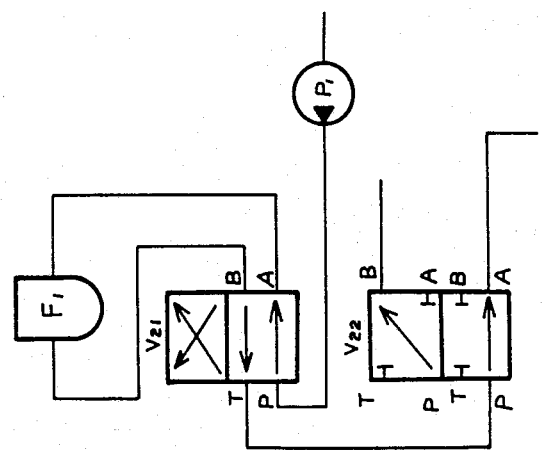

Each embodiment of the present invention is described as follows:

One of embodiment as shown in FIG. 1 is two-piece cleaning cyclic return constituted by two sets of four-way valve, wherein two joints A.B of four-way valve are respectively connected with filter F1; joint of V21 connects with outlet P1 of fluid pump; Joint T connects the joint P of V22; joint T of V22 is sealed; joint B of V22 connects normal outlet; joint A of V22 connects relief port; its operation is as follows:

When it is instructed by normal output instructionn, V21, V22 are not electrified, therefore, if P1 is pumped, fluid flows from P of V21 through A, filter F1, and then flows into P of V22 from T through B of V21, and it is transmitted out from outlet of B as shown in FIG. 1-1.

Figures 1, 2, 3:
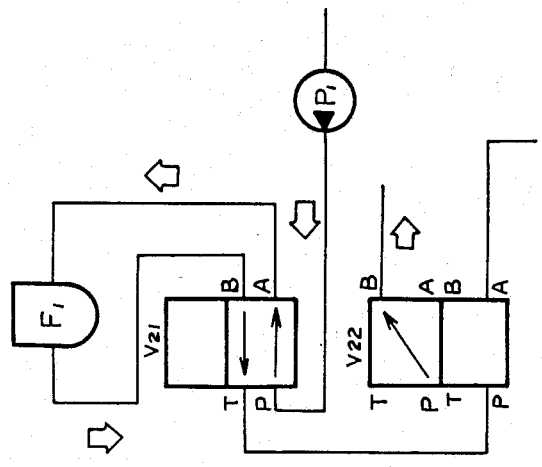
Figures 1, 2:
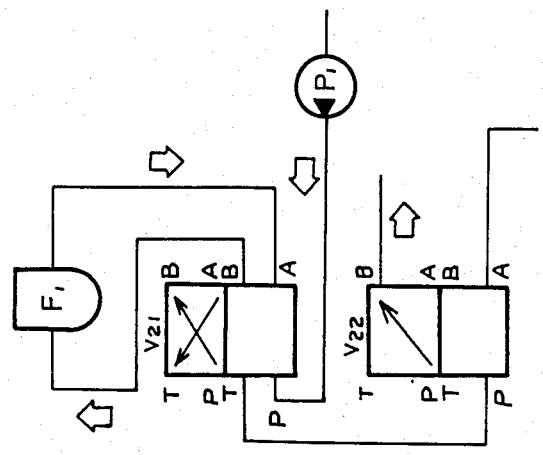
Figure 2:
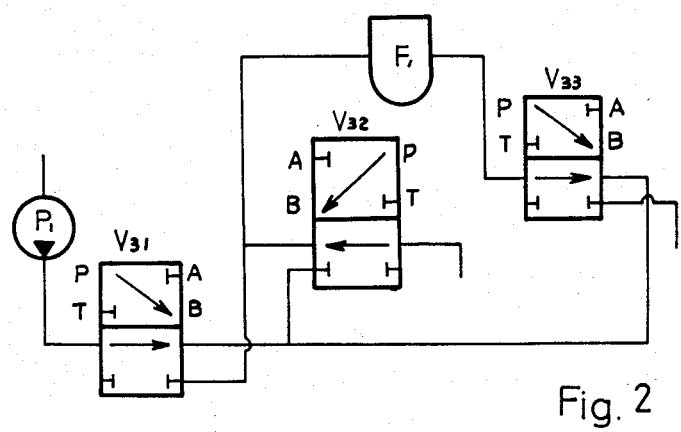
Figures 1, 2:
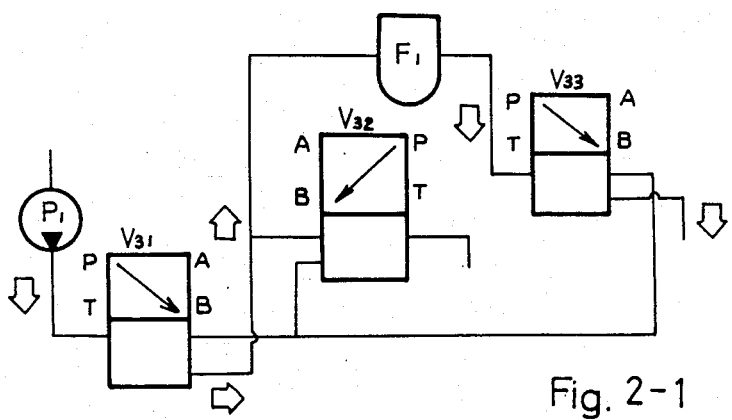
Figure 2:
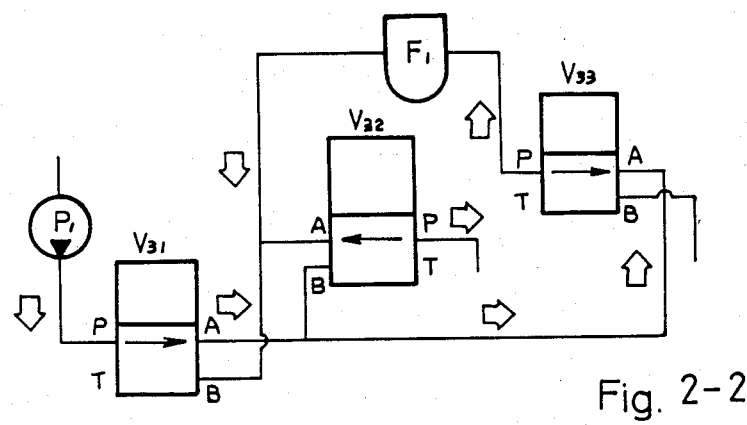
Figures 2, 3:
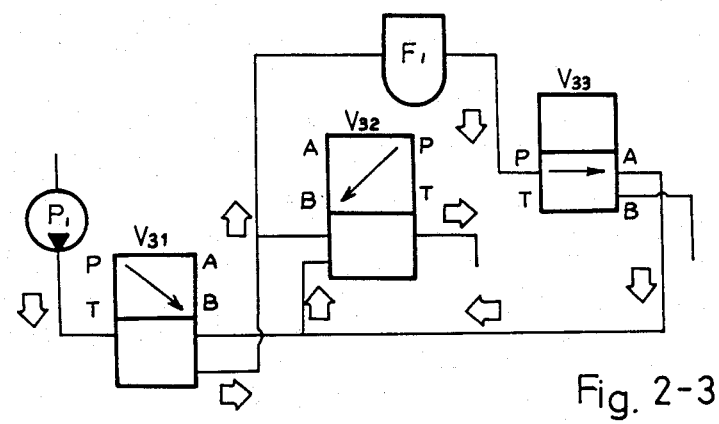
Figure 3:
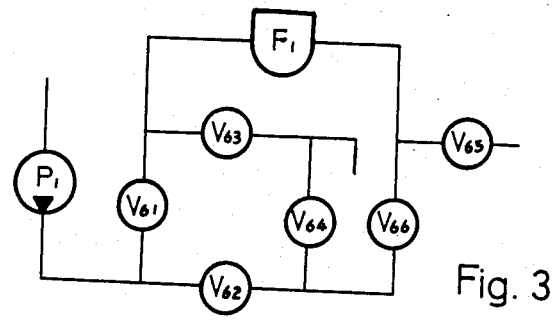
Figures 1, 3:
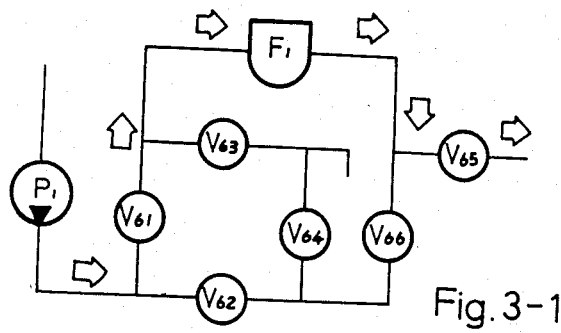
Figures 2, 3:
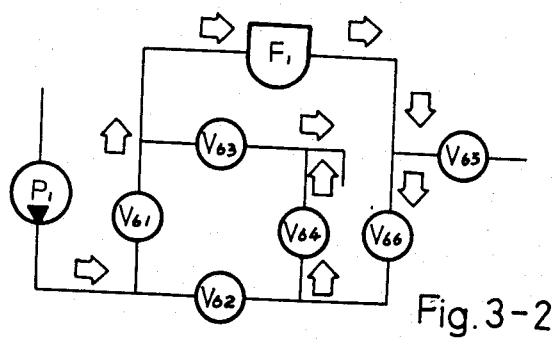
Figure 3:
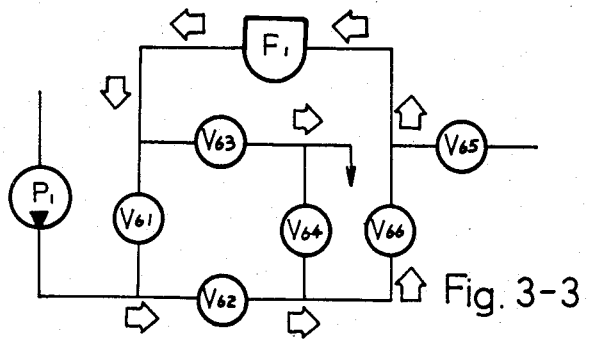

When it is instructed by instruction of cleaning cycle, V21, V22 are electrified, and fluid flows into through joint P of V21, and then flows from joint A to filter F1, and returns to B of V21, and flows from T of V21 to P of V22 through A and out of relief port; and forms reverse flow cleaning as shown in FIG. 1-2;

When it is instructed by instruction of positive flow cleaning, V21 is not electrified, and V22 is electrified, fluid pumped by pump flows according to the flow direction of filter F1, from P of V21 and B into filter F1 and then flows from A of V21 through T into V22 and forms in positive direction to constitute positive flow cleaning as shown in FIG. 1-3;

When V21, V22 are broken circuits, it is under preparative status.

The electrified status of above V21 and V22 also can be that firstly V21 is not electrified, V22 is electrified, and then both of V21, V22 turn to be electrified in order to form cleaning cycle which is firstly cleaned in positive flow and then in reverse flow, and it can be cleaned repeatedly;

After finishing the above cleaning cycle, both of V21, V22 are broken circuit under preparative status, its acting procedure are shown in Chart 1.

The second embodiment of the present invention as shown in FIG. 2 is three-piece cleaning cyclic return constituted by three sets of four-way valve, wherein joint P of four-way valve V31 connects outlet of fluid pump in order to let fluid be pumped into; all the joints T of V31, V32, V33 are sealed; joint A of V31; joint B of V32 and joint A of V33 are communicated together; joint B of V31 communicated with joint A of V32 and the input end of filter F1; joint P of V32 connects with relief port; joint P of V33 communicates with outlet of filter, joint B of V33 connects with normal outlet; its operation is as follows:

When it is under normal status, V31, V32, V33 are not electrified, and if it is instructed by the instruction of normal output and fluid pump P1 is pumped, fluid flows from P of V31, into V31, and then flows out from B to filter F1, and then flows into P of V33 through filter F1, and finally flows out of normal outlet through B of V33, as shown in FIG. 2-1;

When it is instructed by instruction of cleaning cycle, V31, V32, V33 are electrified, and fluid flows from P of V31 to A of V31, and then flows into A of V33, and through P of V33 to flow into filter F1 in reverse flow, and then flows to A of V32, and through P of V32 flows to relief port and forms reverse flow cleaning as shown in FIG. 2-2;

When it is instructed by instruction of positive flow cleaning, V33 is electrified, V31, V32 are not electrified, therefore, fluid flows from P of V31 and out from B of V31, and then flows into filter F1, and out from outlet of filter F1 and then flows into P of V33, and out from A of V33, and then flows into B of V32 and through relief port of P of V32 to form positive flow cleaning, as shown in FIG. 2-3.

Also, consequence of positive flow and reverse flow of embodiment 2 can be reverse, and it can make time or more positive flow cleaning cycle; after finishing above cleaning cycle, all the V31, V32, V33 are broken circuits to form prepareative status, its acting procedure is as shown in Chart 2.

All or part of valves as shown in FIGS. 1 and 2 also can be constituted by multi-set of simple two-way switch valve, now, there exemplifies and embodiment of two-way valve. It can be analogized that there are many partial substitutions.

The embodiment as shown in FIG. 3 is constituted by six sets of two-way switch valve V61, V62, V63, V64, V65, V66, wherein P of V61 communicates with P of V62 and connects to the outlet of P1 of fluid pump; joint A of V61 communicates with P of V63 and connects to the inlet of filter F1; joints P of V65 and V66 communicates with outlet of filter; joint A of V65 connects with normal outlet; joint A of V66 communicates with joint P of V64 and joint A of V62; joint A of V63 communicates with joint A of V64 to connect relief port, its operation is as follows:

When it is pumped by normal operation, V61, V65 are electrified, the pumped fluid flows from joint P of V61 into V61, and then through joint A of V61 into filter F1, and then it flows through outlet of F1 into joint P of V65, and then flows out from normal outlet through joint A of V65, as shown in FIG. 3-1;

When it is instructed by instruction of cleaning cycle, V61, V66, V64 are electrified, fluid flows through V61 into filter F1, and then flows through V66, V64, and out from relief port to make positive flow cleaning as shown in FIG. 3-2;

When it is instructed by instruction of reverse flow cleaning, V62, V66, V63 are electrified, and fluid flows from V62 through V66 into filter F1, and then through V63 to flow out from relief port and make reverse flow cleanin as shown in FIG. 3-3;

When cleaning cycle is finished, V61 V66 are returned to be electrified under preparative status; above acting procedure is shown in Chart 3.

The design of cyclic control switch and circuit used in each embodiment are many designs which includes traditional electric mechanical driving type of cyclic timer matching with auxiliary timing device in order to drive electro-magnetic valve group, or program controller constituted by multi-sectional setting digital type of electronic cycle time is used for control, or it is c nstituted by microprocessor and related driving interface, but the element of the present invention is to possess function of periodically automatic positive flow reverse flow cleaning cycle of filter for fluid pumping supply device, above means are conventional prior art, its priciple is to use cyclic control switch, therefore, it will not be repeated, it is only illustrated by single cycle in the present invention.

Figure 4:
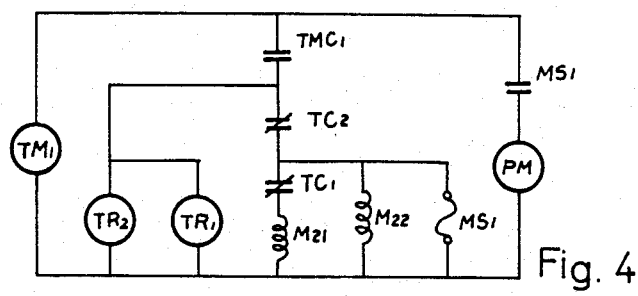
FIG. 4 is a diagram of driving circuit of embodiment as shown in FIG. 1.

FIG. 4 is an embodiment of circuit used for controlling the above two-piece return set as shown in FIG. 1, in figure, when cyclic timer TML is at the setting time, contact point TMC1 is conducted, timers TRL, TE2 and electro-magnetic valves M21, M22 and operational relay of fluid pump MS1 are electrified, and let flow passage is under reverse flow cleaning status; when timer TR1 with short setting time is at the setting time, contact point TC1 is broken circuit, electro-magnetic valve M21 is not electrified, in the meantime, flow passage is under positive flow cleaning status, when timer TR2 also at the setting time, electro-magnetic valve M22 and electro-magnetic switch MS1,is also broken circuit, in the meantime, return is under preparative status; when the setting conductive time of TM1 is over, TR1, TR2, MS1, M21, M22 are not electrified, also they are under preparative status.

Figure 5:
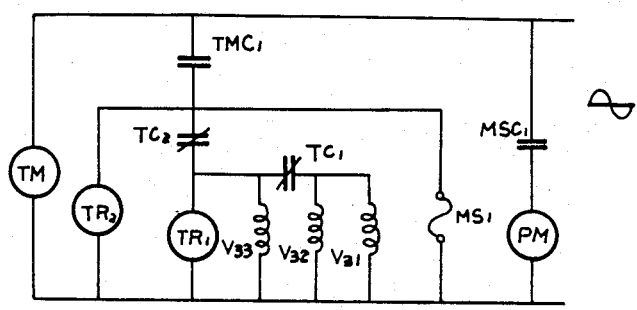
FIG. 5 is a diagram of driving circuit of embodiment as shown in FIG. 2.

FIG. 5 is the driving circuit for controlling above threepiece return set as mentioned in the second embodiment, in figure, cyclic timer TM1 is conducted during the setting time, contact point TMC1 is conducted, timers TR1, TR2 are electrified and conducted, wherein the setting time of TR2 is longer than TR1, and four-way valve V33 and TR1 are connected in parallel, the series is controlled by the constantly sealed contact point TC2; after being connected in parallel, one end of four-way valve V32 connects in parallel with the constantly sealed contact point TC1 of timer TRL, and then connects in parallel with TR1, four-way valve, motor operational relay MS1; when contact point TMC1 of cyclic timer TM1 is at "on", timers TRL, TR2 and four-way valves V31, V32, V33 are electrified and form reverse flow cleaning; when timer TR1 is at the setting time and acts, four-way valves V32, V31 are broken circuits and form positive flow cleaning, when timer TR2 is at the setting time, TR1, V33 and MS1 are also broken circuits and finish the cleaning cycle; when cyclic timer TM1 is at the setting time, TMC1 is broken circuit and forms preparative status, its acting procedure is shown in that 2.

Figure 6:
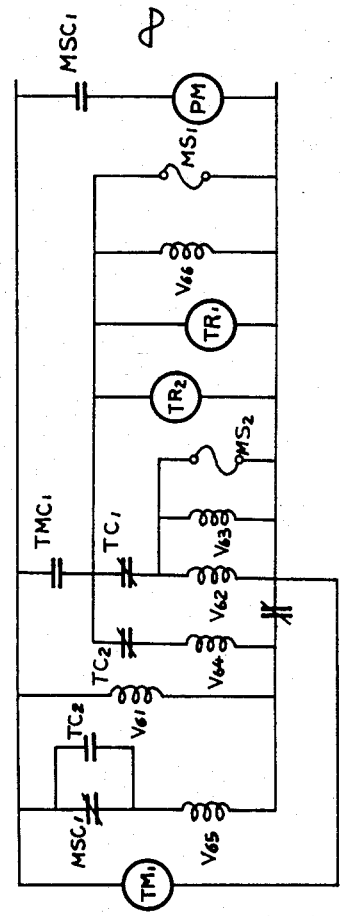
FIG. 6 is a diagram of driving circuit of embodiment as shown in FIG. 3.

FIG. 6 is the driving circuit for controlling above six-piece return set as mentioned in the third embodiment, in figure, when cyclic timer is not at the setting time, TMC1 is open circuit, and only electro-magnetic valves V65, V61 are closed circuits, and they are under preparative status, when cyclic timer TM1 is at the setting time, its contact point TMC1 in closed, therefore, in circuit, auxiliary timers TR1, TR2, two-way valves V62, V63, V66 and auxiliary relaies MS1, MS2 are electrified, motor of fluid pump also driven by electricity to make reverse flow cleaning; when timer TR1 is at the setting time, its contact point TC1 is opened and two-way valves V62, V63 and relay MS2 are broken circuits, MS1 and V66 are electrified, simultaneously V64 V61 are conducted, and V65 is controlled in series by the constant closed contact point MSC1 of MS1, therefore, it still does not act, at that time, it produces positive flow cleaning action; when timer TR2 is at the setting time and acts, two-way valve V64 is broken circuit, V65 is then electrified again, and simultaneously V61, V65 is under preparative status which is as same as before it is not at the setting time of TM1, its acting procedure is shown in Chart 3.

And the electro-magnetic control valve group of above-mentioned cyclic cleaning device further can be return which is constituted by traditional multi-set rotary valve and driven by shaft of a driving motor after deceleration, when it is at the setting time of cyclic cleaning, the driving motor of rotary valve is driven by electricity till it is broken circuit, due to the rotation of rotary valve, it produce function of positive and reverse flow cleaning when connecting return as shown in FIGS. 1, 2,3 is conducted by the inside distribution.

Figure 7:
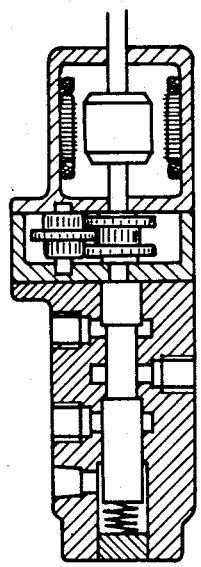
FIG. 7 is a graphic view of embodiment of multi-way rotary type of electrical valve set.

Further character of the present driven motor is to possess a fixed angular stopping cam which is coaxial with rotary valve and limit switch, this switch and control switch of driving motor are in parallel to possess locking function after being conducted in order to keep the driving motor continuously rotating to return and is at the original point of preparative status if the control switch of the driving motor is cut in the cleaning cycle, it is as shown in FIG. 7.

Figure 8:
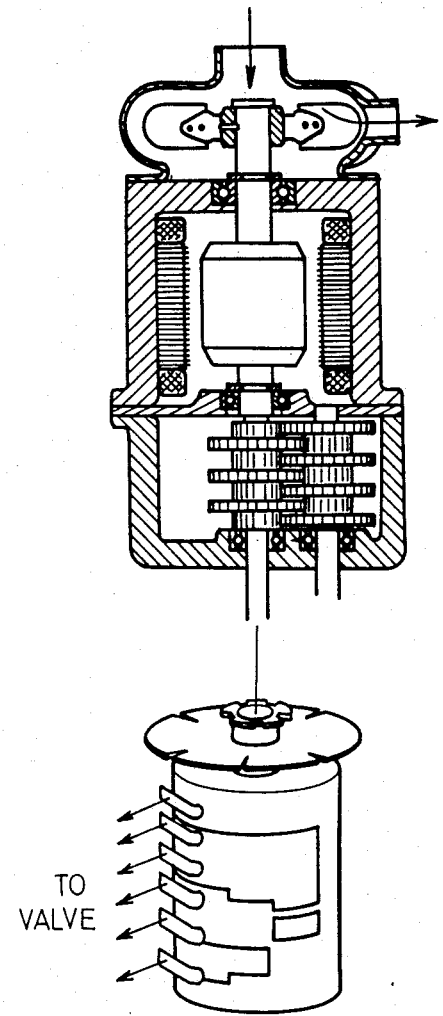
FIG. 8 is a graphic view of accumulative control system.

Furthermore, besides the above instruction of cyclic cleaning can be reached by cyclic timer, further it can be reached by the setting switch device of the accumulated flow or a set of switch which is driven by shaft of driving motor of fluid pump after being properly decelerated and driven by proper touching structure, or other light-electrical or electro-magnetic type of switch to provide control signal for substituting the similar function of periodic switch of above cyclic timer TM1, the merit of above design is to refer the actual accumulated use quantity of fluid pump for sending out the instruction of cleaning cycle in substitution for above timing periodic cleaning cycle, its structural graphic view is as shown in FIG. 8.

Figure 9:
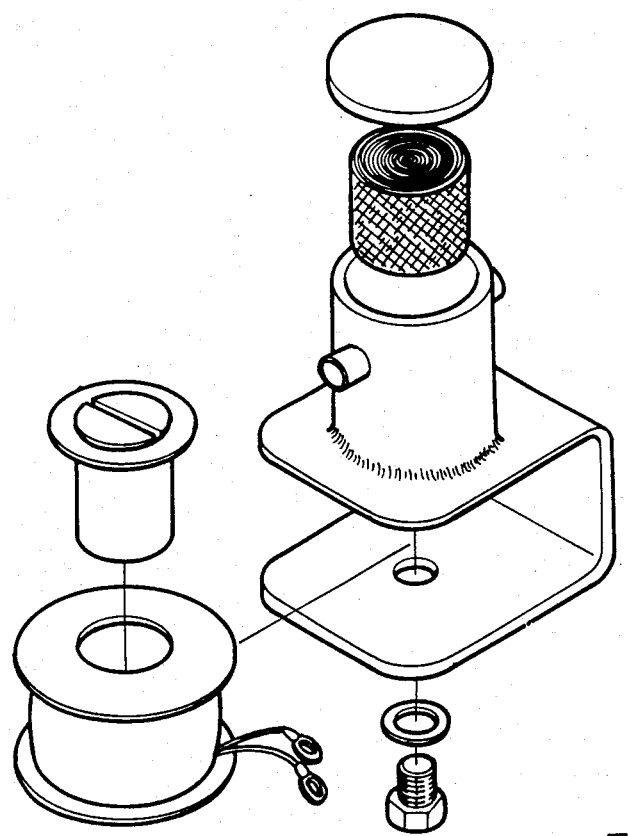
FIG. 9 is a graphic view of filter assembled with electromagnetic oscillatory device.
Figure 9:
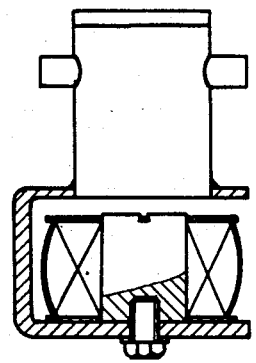

And the further design of the present invention promoting cleaning function is to couple with an electro-magnetic oscillatory device on the housing of filter, this electro-magnetic oscillatory device is controlled by contact point of cyclic timer TM1, for producing oscillation in cleaning cycle in order to clean the dirts and useful for cleaning, its structure is as shown in FIG. 9.

Summing up, the present invention is helpful for the cleaning of automatic selling machine, automatic drinking fluid supply machine and it is good for the health of consumer and the function of the present automatically periodical cyclic positive and reverse flow cleaning is practical and has never been found, therefore, it is novel and practical.

I claim:

1. In a fluid supply system, wherein in its working mode a pump delivers fluid through a filter in one direction to a discharge outlet an improvement comprising a relief outlet and controlled valve means interposed between said pump and said discharge outlet and between the pump and the relief outlet, means for selectively controlling said controlled valve means (1) to effect delivery to fluid from said pump through said filter, in the one direction, and through said valve means to said discharge outlet in the working mode, (2) to effect passage of fluid from said pump through said filter, in a direction opposite to the one direction, and through the valve means to said relief outlet in reverse cleaning mode and (3) to effect passage of fluid from said pump through said filter, in the one direction, and through the valve means to said relief outlet in forward cleaning mode.

2. The fluid supply system according to claim 1, wherein said controlled valve means comprises two four-way valves.

3. The fluid supply system according to claim 1, wherein said controlled valve means comprises three four-way valves.

4. The fluid supply system according to claim 1, wherein said controlled valve means comprises six two-way valves, 5. The fluid supply system according to claim 1, wherein said valve means are electromagnetic valve means.

6. The fluid supply system according to claim 1, wherein said means for selectively controlling includes a microprocessor 7. The fluid supply system according to claim 1, wherein said means for selectively controlling comprises an electronic timing circuit.

8. The fluid supply system according to claim 1, wherein said means for selectively controlling comprises an electromechanical timer.

9. The fluid supply system according to claim 1, including means for moving said filter when either of the cleaning modes are in effect.

10. The fluid delivery system according to claim 1, including means responsive to quantity of fluid delivered to the disclosed output for automatically actuating said means for selectively controlling to imitate operation in the cleaning modes.

11. The fluid delivery system according to claim 1, wherein said valve means comprises a plurality of multi-way valves.

* * * * *